No. 716,082. Patented Dec. 16, 1902.
W. B. McKINLY.
STALK PULLER.
(Application filed June 14, 1902.)
(No Model.)
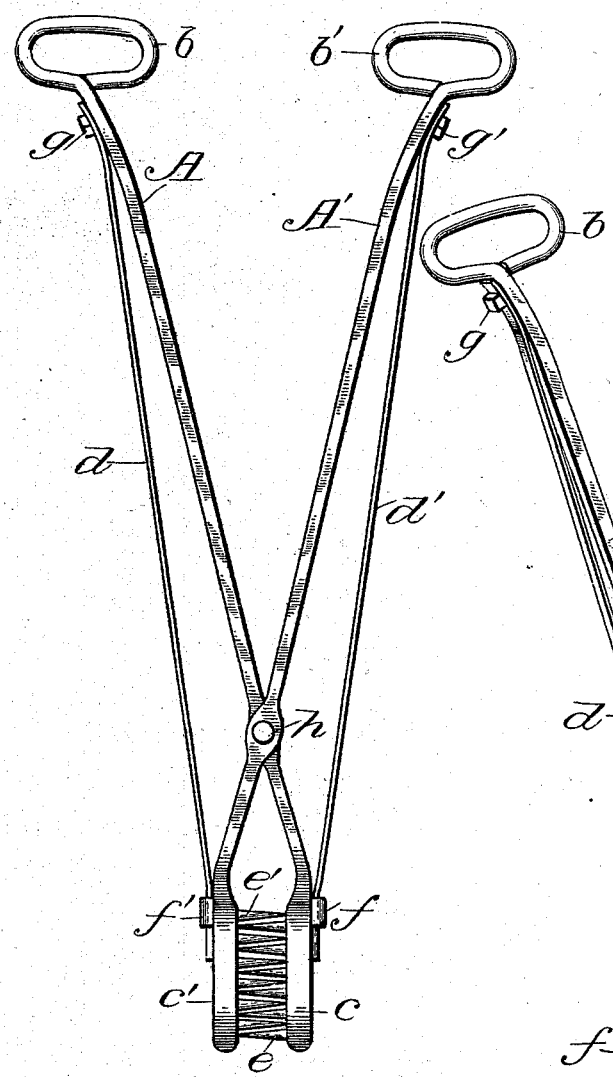
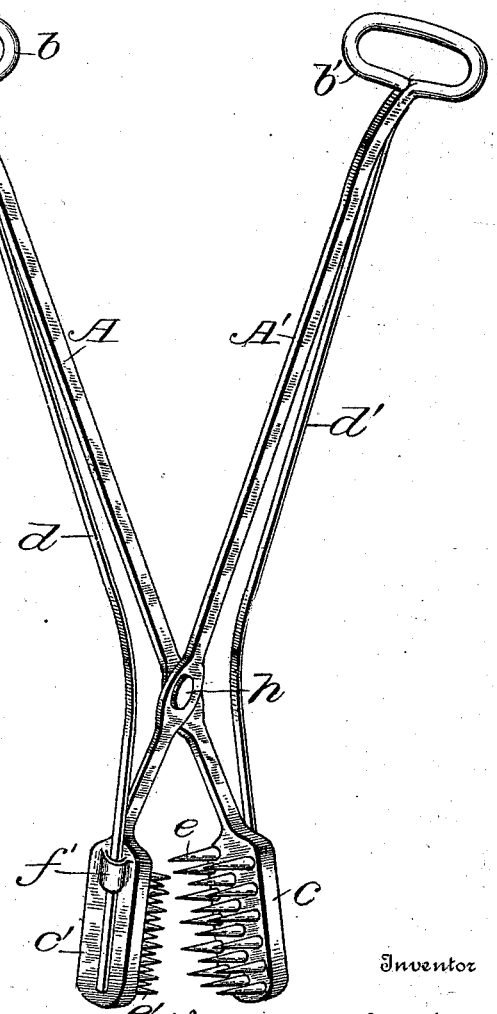
Witnesses
C. H. Walker.
J. T. Walker.
Inventor
William B. McKinly
By Victor H. Wallace
Attorney.

UNITED STATES PATENT OFFICE.

WILLIAM B. McKINLY, OF CHESTNUT, ALABAMA.

STALK-PULLER.

SPECIFICATION forming part of Letters Patent No. 716,082, dated December 16, 1902.

Application filed June 14, 1902. Serial No. 111,633. (No model.)

*To all whom it may concern:*

Be it known that I, WILLIAM B. MCKINLY, a citizen of the United States, residing at Chestnut, in the county of Monroe and State of Alabama, have invented a new and useful Improvement in Stalk-Pullers, of which the following is a specification.

The object of my invention is to provide a stalk-puller for general use which will secure a firm hold upon the plant to be removed from the ground and retain the same independent of any force exerted by the user.

A further object is to provide a device especially adapted for pulling cotton-stalks.

In the accompanying drawings, Figure 1 is a side view of the stalk-puller when closed. Fig. 2 is a perspective view of the stalk-puller when open.

The device herein described is composed of the curved tong-levers A and A', which cross each other at equal distances from their respective extremities and are pivoted together at $h$ nearer their lower than their upper extremities. Their upper extremities are provided with the handles $b$ $b'$ and their lower extremities end in the jaws $c$ and $c'$. These jaws $c$ and $c'$ are each provided with rows of teeth $e$ and $e'$, so disposed upon the meeting faces of the jaws that when they are brought together the teeth of one jaw will mesh with the teeth of the other jaw. These teeth are in the shape of sharp spikes.

Fastened to the back of the lever A, near the handle $b$, by means of the nut $g$ or in any convenient manner, is the spring $d$. This spring, which is preferably flat in form, extends downward, and its lower end is loosely held in position against the back of the lever A' by means of the loop or guide $f'$, located on or near the jaw $c'$. A corresponding spring $d'$ is fastened to the opposite lever and correspondingly secured by a guide $f$ on or near the jaw $c$. These springs are of sufficient strength and rigidity and exercise sufficient force upon the opposite ends of the levers A and A' at the points $g$ and $f'$ and $g'$ and $f$, respectively, by reason of the curved formation of the levers, to normally hold the jaws $c$ and $c'$ in close contact.

When the stalk-puller is in use, the jaws are forced apart by means of outward pressure on the handles, the springs $d$ and $d'$ bending inwardly as the jaws open and increasing their pressure on the extremities of the tong-levers the wider the jaws are forced apart. The lower ends of the springs slide through the guides $f$ and $f'$ as the jaws open. When sufficiently apart, the jaws are slipped over the plant to be removed from the ground and the outward pressure on the handles is relaxed. When the handles are thus released, the springs force the jaws firmly together and the rows of teeth $e$ and $e'$ sink into the fiber of the plant-stalk. This relieves the user from the necessity of keeping the jaws in contact by the exertion of inward pressure on the handles and leaves him at liberty to use his entire strength in pulling the plant from the ground.

This device is especially adapted for use in pulling up cotton-stalks. The fiber of the cotton-stalk is tough and slippery and its roots are firmly embedded in the ground. The sharp spiked teeth of the device enable it to secure a firm hold on the cotton-plant and the spring-grasp, as above explained, makes it especially useful under conditions where considerable exertion is required to remove the plant.

What I claim as my invention, and desire to secure by Letters Patent, is—

1. A stalk-puller comprising crossed tong-levers pivotally connected, having handles at their upper extremities and ending at their lower extremities in jaws provided with rows of intermeshing teeth, the extremity of each lever being connected with the opposite extremity of the other lever by a spring, substantially as herein shown and for the purpose set forth.

2. A stalk-puller comprising crossed tong-levers pivotally connected, having jaws at their lower extremities provided with rows of intermeshing teeth formed of sharp spikes, substantially as herein shown and for the purpose set forth.

3. A stalk-puller comprising crossed tong-levers pivotally connected, ending in jaws held in normal contact by means of springs, substantially as herein shown and for the purpose set forth.

4. In a stalk-puller the combination of the pivotally-connected tong-levers having terminal jaws, with the springs connecting the opposite extremities of said levers and holding the meeting faces of the jaws in normal contact, substantially as herein shown and for the purpose set forth.

5. In a stalk-puller, the combination of the tong-levers A and A', the handles $b$ and $b'$ and the jaws $c$ and $c'$, with the springs $d$ and $d'$, the guides $f$ and $f'$ and the teeth $e$ and $e'$, substantially as herein described and for the purpose set forth.

In testimony whereof I have signed my name to this specification in the presence of two subscribing witnesses.

WILLIAM B. McKINLY.

Witnesses:
    JACKSON A. McKINLEY,
    F. D. WILLIAMS.